(12) United States Patent
Vaisanen et al.

(10) Patent No.: US 9,363,817 B2
(45) Date of Patent: Jun. 7, 2016

(54) MUTUAL INFORMATION BASED SIGNAL TO INTERFERENCE PLUS NOISE RATIO ESTIMATOR FOR RADIO LINK MONITORING

(75) Inventors: Petri Vaisanen, Kempele (FI); Kari Majonen, Haukipudas (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 486 days.

(21) Appl. No.: 13/522,283

(22) PCT Filed: Jan. 21, 2010

(86) PCT No.: PCT/FI2010/050032
§ 371 (c)(1),
(2), (4) Date: Feb. 26, 2013

(87) PCT Pub. No.: WO2011/089304
PCT Pub. Date: Jul. 28, 2011

(65) Prior Publication Data

US 2013/0195023 A1 Aug. 1, 2013

(51) Int. Cl.
*H04W 4/00* (2009.01)
*H04W 72/08* (2009.01)
*H04L 1/20* (2006.01)
(Continued)

(52) U.S. Cl.
CPC ............. *H04W 72/085* (2013.01); *H04B 17/26* (2015.01); *H04B 17/336* (2015.01); *H04L 1/20* (2013.01)

(58) Field of Classification Search
CPC .................................................... H04B 17/006
USPC ........................................................ 370/329
See application file for complete search history.

(56) References Cited

U.S. PATENT DOCUMENTS 6,463,295 B1 * 10/2002 Yun .......................... H04L 1/20 455/522
6,922,551 B1 * 7/2005 Bristow ................ H04W 16/14 455/103
8,219,128 B2 * 7/2012 Zangi et al. .................. 455/501
(Continued)

FOREIGN PATENT DOCUMENTS

CN 101053269 A 10/2007
CN 101421914 A 4/2009
WO 2007/121024 A2 10/2007

OTHER PUBLICATIONS

Office action received for corresponding Chinese Patent Application No. 201080061924.2, dated Dec. 9, 2013, 5 pages, No English Language Translation available.

(Continued)

*Primary Examiner* — Guang Li
(74) *Attorney, Agent, or Firm* — Squire Patton Boggs (US) LLP

(57) ABSTRACT

An effective SINR mapping based approach can be used to average the MI or RBIR values corresponding to narrowband SINR values in frequency between the resource blocks of the E-UTRA grid structure and then to estimate the downlink radio link quality from the averaged mutual information domain value by mapping it back to wideband SINR value covering the whole or partial E-UTRA system bandwidth. This wideband SINR value can then be further averaged in time and used as a downlink radio link quality estimate for E-UTRA radio link monitoring. Mutual information based effective SINR mapping is one example of an effective SINR mapping based approach.

19 Claims, 13 Drawing Sheets

(51) Int. Cl.
*H04B 17/26* (2015.01)
*H04B 17/336* (2015.01)

(56) References Cited

U.S. PATENT DOCUMENTS

| | | | | |
|---|---|---|---|---|
| 8,675,794 | B1 * | 3/2014 | Perets et al. | 375/349 |
| 2006/0251180 | A1 * | 11/2006 | Baum et al. | 375/260 |
| 2007/0298822 | A1 | 12/2007 | Wan et al. | |
| 2008/0084829 | A1 * | 4/2008 | Visuri | 370/252 |
| 2009/0147865 | A1 * | 6/2009 | Zhang et al. | 375/259 |
| 2009/0274204 | A1 * | 11/2009 | Chen et al. | 375/228 |
| 2009/0296864 | A1 * | 12/2009 | Lindoff et al. | 375/357 |
| 2010/0034092 | A1 * | 2/2010 | Krishnamurthy et al. | 370/241 |
| 2010/0232384 | A1 * | 9/2010 | Farajidana et al. | 370/329 |
| 2011/0122787 | A1 * | 5/2011 | Wang et al. | 370/252 |
| 2012/0033625 | A1 * | 2/2012 | Nagata et al. | 370/329 |
| 2012/0057484 | A1 * | 3/2012 | Wan | H04L 1/0026 370/252 |
| 2013/0128820 | A1 * | 5/2013 | Yuan | H04W 36/385 370/329 |

OTHER PUBLICATIONS

Lin et al., "Link-to-System Performance Mapping Based on Effective SNR", IEEE S80216m-07/059, Mar. 13, 2007, pp. 1-12.

Quiroga, "Link-to-System Interfaces for System Level Simulations Featuring Hybrid ARQ", Masters thesis, Nov. 11, 2008, 85 pages.

"3rd Generation Partnership Project; Technical Specification Group Radio Access Network; Evolved Universal Terrestrial Radio Access (E-UTRA); Physical Layer Procedures (Release 8)", 3GPP TS 36.213, V8.8.0, Sep. 2009, pp. 1-77.

"3rd Generation Partnership Project; Technical Specification Group Radio Access Network; Evolved Universal Terrestrial Radio Access (E-UTRA); Requirements for Support of Radio Resource Management (Release 8)", 3GPP TS 36.133, V8.7.0, Sep. 2009, pp. 1-317.

"3rd Generation Partnership Project; Technical Specification Group Radio Access Network; Evolved Universal Terrestrial Radio Access (E-UTRA); Physical Channels and Modulation (Release 8)", 3GPP TS 36.211, V8.8.0, Sep. 2009, pp. 1-83.

Tuomaala et al., "Effective SINR Approach of Link to System Mapping in OFDM/Multi-Carrier Mobile Network", 2nd International Conference on Mobile Technology, Applications and Systems, Nov. 15-17, 2005, 5 pages.

International Search Report and Written Opinion received for corresponding International Patent Application No. PCT/FI2010/050032, dated Oct. 14, 2010, 11 pages.

"IEEE 802.16m Evaluation Methodology Document (EMD)", IEEE 802.16 Broadband Wireless Access Working Group, IEEE 802.16m-08/004r1, Mar. 17, 2008, pp. 1-162.

Tsai et al., "Effective-SNR Mapping for Modeling Frame Error Rates in Multiple-state Channels", 3GPP2-C30-20030429-010, Apr. 2003, 16 pages.

Roshni Srinivasan et al., "IEEE 802.16m Evaluation Methodology Document (EMD)", XP068003301, Jan. 15, 2009.

Hui Lin Ritt et al., "Effective SNR Calculation for Frequency Selective Fading Channel", Jun. 20, 2005.

European Search Report application No. 10843784.9 dated Apr. 23, 2015.

Supplementary European Search Report application No. 10843784.9 dated May 12, 2015.

Communication pursuant to Article 94(3) EPC dated Mar. 14, 2016 corresponding to European Patent Application No. 10843784.9.

* cited by examiner

The resource grid structure of E-UTRA

The resource elements used for cell-specific reference signal transmission

MUTUAL INFORMATION BASED SIGNAL TO INTERFERENCE PLUS NOISE RATIO ESTIMATOR FOR RADIO LINK MONITORING

RELATED APPLICATION

This application was originally filed as PCT Application No. PCT/FI2010/050032 filed Jan. 21, 2010.

BACKGROUND

1. Field

The downlink radio link quality in wireless mobile radio communication system can vary in time and in frequency due to the frequency selective multipath fading radio propagation environment. A user equipment (UE) can support the radio resource management of a Node B by monitoring the downlink radio link quality of the serving cell or cells during the connection in order to indicate if reliable enough communication is possible in downlink and in uplink. Thus, if downlink is not reliable enough for communication then uplink communication can also be shut down.

2. Description of the Related Art

Downlink radio quality is conventionally estimated in receivers based on both transmission power control and cell-specific reference signals. These signals are distributed to the whole system bandwidth by spreading in narrowband or wideband Code Division Multiple Access (CDMA) transmitter or by design in the Time Division Multiple Access (TDMA) transmitter and thus the post-detection Signal to Interference plus Noise Ratio (SINR) values are not frequency-selective due to the despreading or by design in the receiver. In other words, the interference is not frequency-selective due to the CDMA or TDMA signal used. There is no attempt made to average the SINR values in frequency across the system bandwidth in the conventional, for example, 3rd Generation (3G) receivers. Each radio link monitoring out-of-sync or in-sync decision in 3G is made by comparing the long term SINR estimate to the pre-defined Qout and Qin thresholds.

SUMMARY

In certain embodiments the present invention is a method. The method includes using an effective SINR mapping based approach to average the MI or RBIR values corresponding to narrowband SINR values in frequency between the resource blocks of the resource grid structure or between the sub-carriers in traditional Orthogonal Frequency Division Multiple Access (OFDMA), to produce an averaged mutual information domain value. Estimating downlink radio link quality from the averaged mutual information domain value by mapping the averaged mutual information domain value back to a wideband SINR value covering a part up to the whole of the system bandwidth is also included in the method. The method additionally includes further averaging the wideband SINR value in time to provide a time-averaged SINR value. The method also includes using the time-averaged SINR value as a downlink radio link quality estimate for radio link monitoring. In additional embodiments, a computer-readable storage medium is encoded with instructions that, when executed in hardware, perform the preceding method.

Certain embodiments of the present invention include an apparatus having at least one memory including computer program code, and also having at least one processor. The at least one memory and the computer program code are configured to, with the at least one processor, cause the apparatus at least to use an effective SINR mapping based approach to average the MI or RBIR values corresponding to narrowband SINR values in frequency between the resource blocks of the resource grid structure, to produce an averaged mutual information domain value. The at least one memory and the computer program code are also configured to, with the at least one processor, cause the apparatus at least to estimate downlink radio link quality from the averaged mutual information domain value by mapping the averaged mutual information domain value back to a wideband SINR value covering a part up to the whole of the system bandwidth. The at least one memory and the computer program code are additionally configured to, with the at least one processor, cause the apparatus at least to further average the wideband SINR value in time to provide a time-averaged SINR value. The at least one memory and the computer program code are further configured to, with the at least one processor, cause the apparatus at least to use the time-averaged SINR value as a downlink radio link quality estimate for radio link monitoring.

A further embodiment of the present invention is an apparatus including frequency averaging means for using an effective SINR mapping based approach to average the MI or RBIR values corresponding to narrowband SINR values in frequency between the resource blocks of the resource grid structure, to produce an averaged mutual information domain value. The apparatus also includes estimating means for estimating downlink radio link quality from the averaged mutual information domain value by mapping the averaged mutual information domain value back to a wideband SINR value covering a part up to the whole of the system bandwidth. Time averaging means for further averaging the wideband SINR value in time to provide a time-averaged SINR value can also be included in the apparatus. The apparatus can additionally include monitoring means for using the time-averaged SINR value as a downlink radio link quality estimate for radio link monitoring.

BRIEF DESCRIPTION OF THE DRAWINGS

For proper understanding of the invention, reference should be made to the accompanying drawings, wherein.

DETAILED DESCRIPTION OF THE PREFERRED EMBODIMENT(S)

Figure 1:
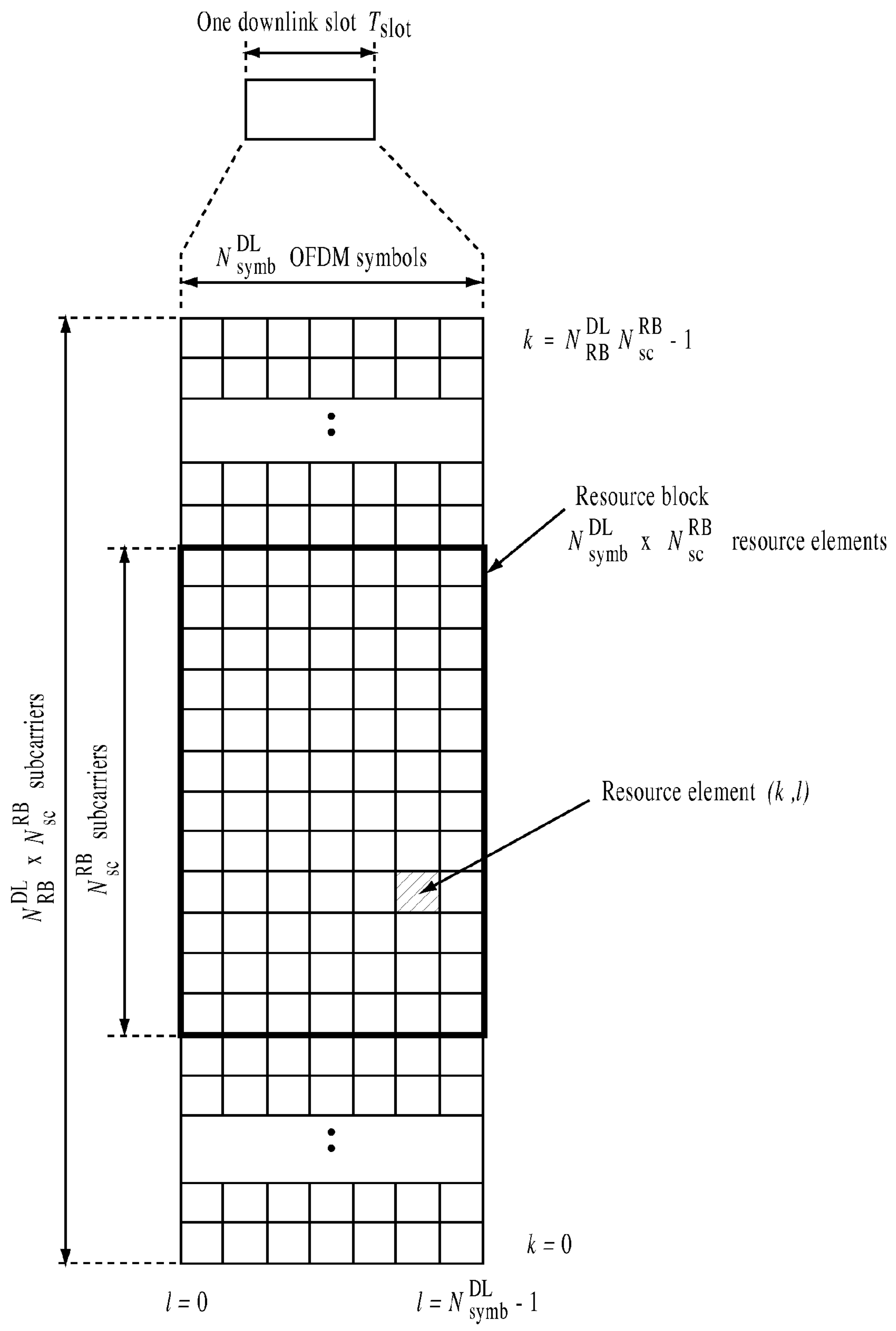
FIG. 1 illustrates a resource grid structure of Evolved Universal Terrestrial Radio Access (E-UTRA).

Downlink radio link quality in wireless mobile radio communication systems can vary in time and in frequency due to the frequency selective multipath fading radio propagation environment. The UE can support the radio resource management of a Node B by monitoring the downlink radio link quality of the serving cell or cells during the connection in order to indicate whether a reliable enough communication is possible in downlink (DL) and in uplink (UL). This monitoring can be based on measurement from cell or UE specific reference signals, transmit power control symbols or common control channels. The downlink radio link quality estimation can, in such cases, be needed in Layer 1 of UE for synchronization tracking and synchronization status reporting after the initial synchronization has been acquired by cell search procedure and after random access procedure. Cell search is a procedure by which a UE acquires time and frequency synchronization with a cell. The synchronization signals can be transmitted in the downlink to facilitate the cell search. The Layer 1 random access procedure can encompass the transmission of random access preambles and random access response to initiate physical downlink dedicated or shared channel related procedures.

An out-of-sync condition can be detected and indicated by Layer 1 of UE when the downlink radio link quality is too low to have sufficiently reliable demodulation performance on physical common or dedicated control channels (PCCCH or PDCCH). Likewise, an in-sync condition can be indicated when in out-of-sync state the downlink radio link quality will be high enough to recover the connection without radio link failure. Radio link failure detection can result in connection re-establishment procedures and the radio link monitoring can be stopped. Also the uplink transmitter power of UE can be turned off when in out-of-sync condition to diminish uplink interference due to the high uplink transmission power needed in bad radio propagation environment of an UE to the serving cell or cells. Uplink power control can control the transmit power of the different uplink physical channels.

In Evolved Universal Terrestrial Radio Access (E-UTRA) the UE can monitor the radio link quality based on the cell-specific reference signal in order to detect the downlink radio link quality of the serving cell. The UE can estimate this downlink radio link quality and compare it to the thresholds Qout and Qin for the purpose of monitoring downlink radio link quality of the serving cell. The two threshold values can provide hysteresis for synchronization state indication. The threshold Qout can be defined as the level at which the downlink radio link cannot be reliably received and can corresponds to, for example, a 10% block error rate of a hypothetical PDCCH transmission. The threshold Qin can be defined as the level at which the downlink radio link quality can be significantly more reliably received than at Qout and can correspond, for example, to a 2% block error rate of a hypothetical PDCCH transmission. The thresholds Qout and Qin can be defined as SINR (dB) values in this context.

Figure 2:
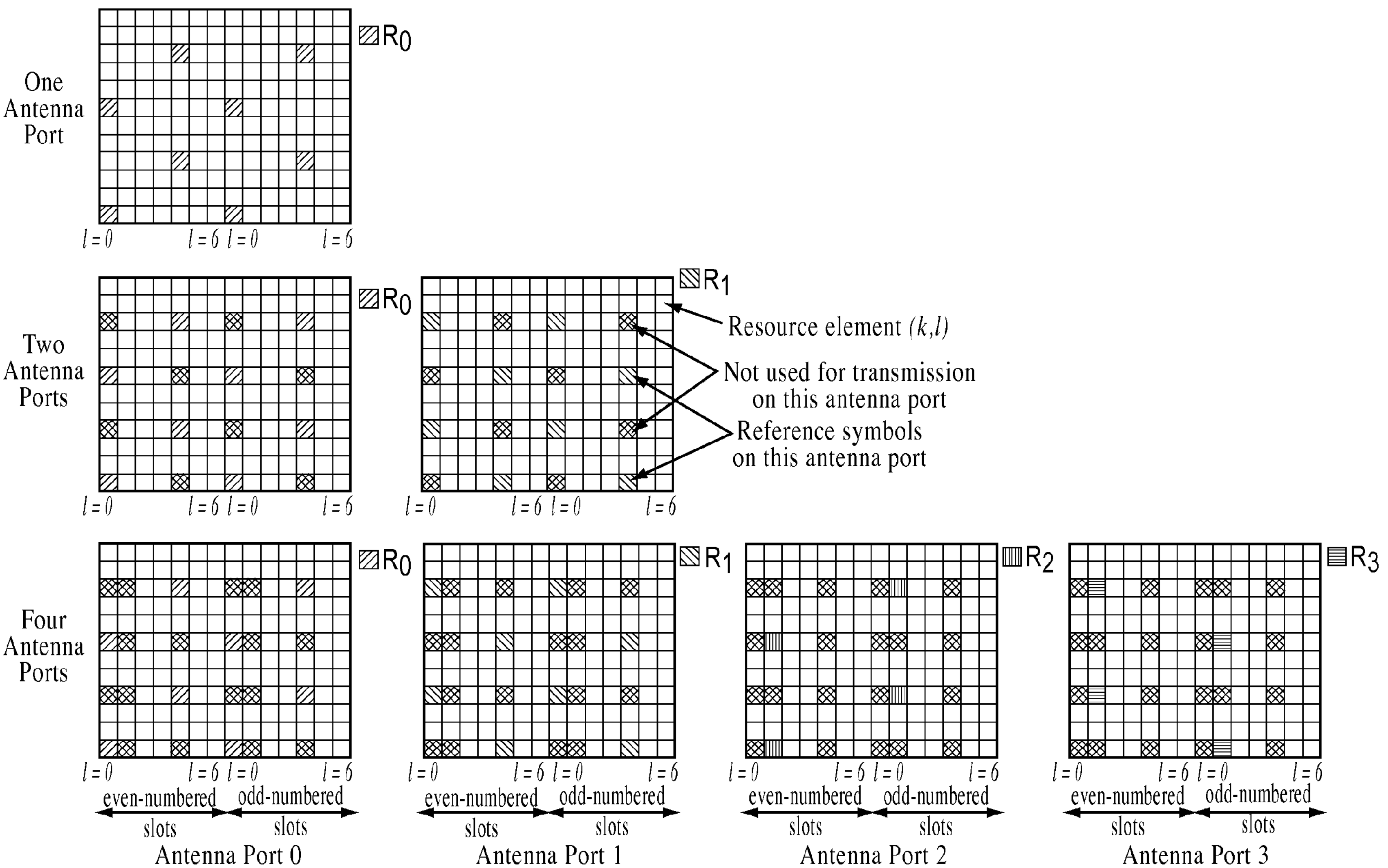
FIG. 2 illustrates resource elements used for cell-specific reference signal transmission.

In E-UTRA, an orthogonal frequency division multiplexed (OFDM) signal can be used, and cell-specific reference signals can be time and frequency multiplexed to the resource element or subcarriers in time and in frequency. FIG. 1 illustrates the resource grid structure of the E-UTRA and FIG. 2 illustrates the resource elements that can be used for cell-specific reference signal transmission for 1, 2 and 4 Tx antenna ports. The channel transfer function can be needed in the demodulation and detection of the transmitted symbols, and in E-UTRA the cell-specific reference signals can be used for estimating this. The interference and noise covariance between Rx antennas can also be estimated from the cell-specific reference signals. These channel and interference and noise covariance estimates can then further be used for estimating the SINR of a reference signal or symbol resource element.

In E-UTRA radio link monitoring, only one SINR value over the whole system bandwidth may be required for radio link monitoring to be able to compare this SINR value to the Qout and to the Qin thresholds. Other implementations, such as dual-carrier or the like are also possible. The resource-element-wise SINR can be averaged in time and in frequency for one resource block, but averaging these values over the different resource blocks or over the whole system bandwidth can be difficult if the interference and radio channel propagation conditions are different between the resource blocks. Also, when using the channel and interference and noise covariance estimates directly in the radio link monitoring, the used receiver structure may not be taken into account in the SINR estimation and thus it would be independent on the post-detection SINR value of the particular receiver structure in question. Different types of interference rejection or interference cancellation receivers can be used in the E-UTRA downlink due to the multiple transmit (Tx) and receive (Rx) antennas and possible Tx diversity or precoding methods and thus the receiver structure can be taken into account in the wideband SINR estimation and in the radio link monitoring.

Certain embodiments of the present invention, however, use an effective SINR mapping based approach (also referred to herein, for the sake of brevity as a "quality mapping approach") to average the MI or RBIR values corresponding to narrowband SINR values in frequency between the resource blocks of the E-UTRA grid structure and then to estimate the downlink radio link quality from the averaged mutual information domain value by mapping it back to wideband SINR value covering the whole or partial E-UTRA system bandwidth. This wideband SINR value can then be further averaged in time and used as a downlink radio link quality estimate for E-UTRA radio link monitoring. Mutual information based effective SINR mapping is one example of an effective SINR mapping based approach.

Figure 3:
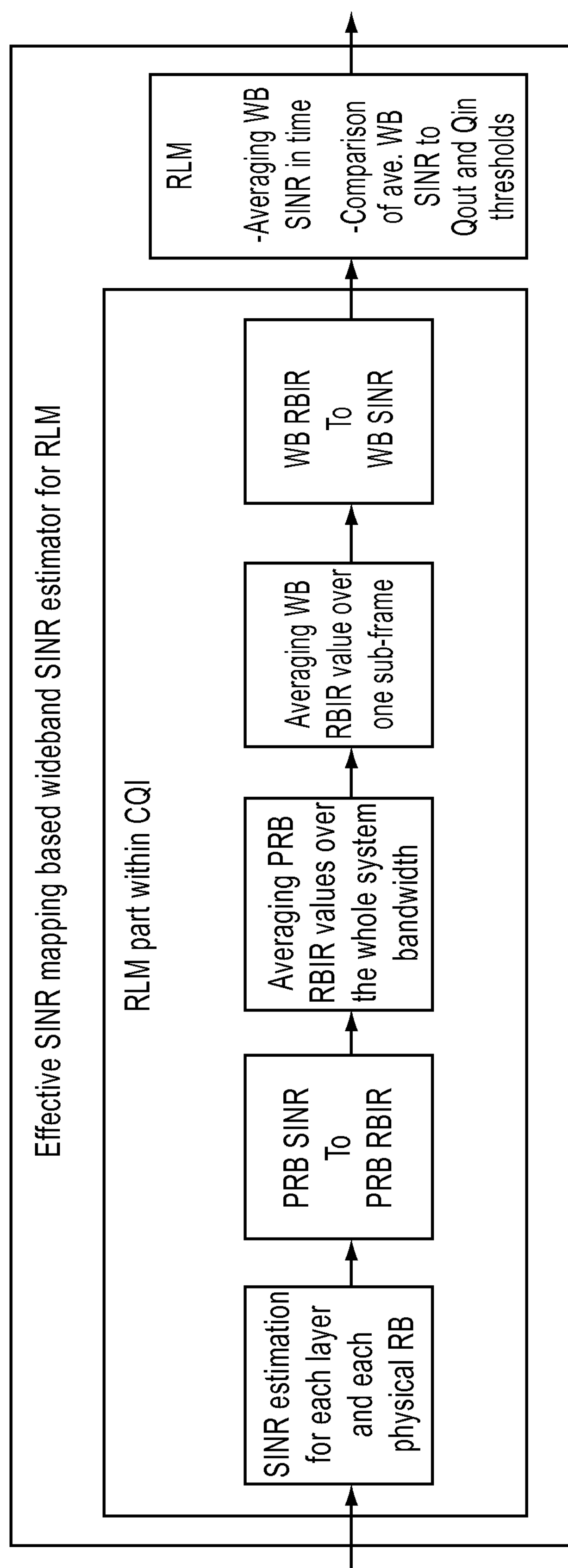
FIG. 3 illustrates a method according to certain embodiments of the present invention.
Figure 4:
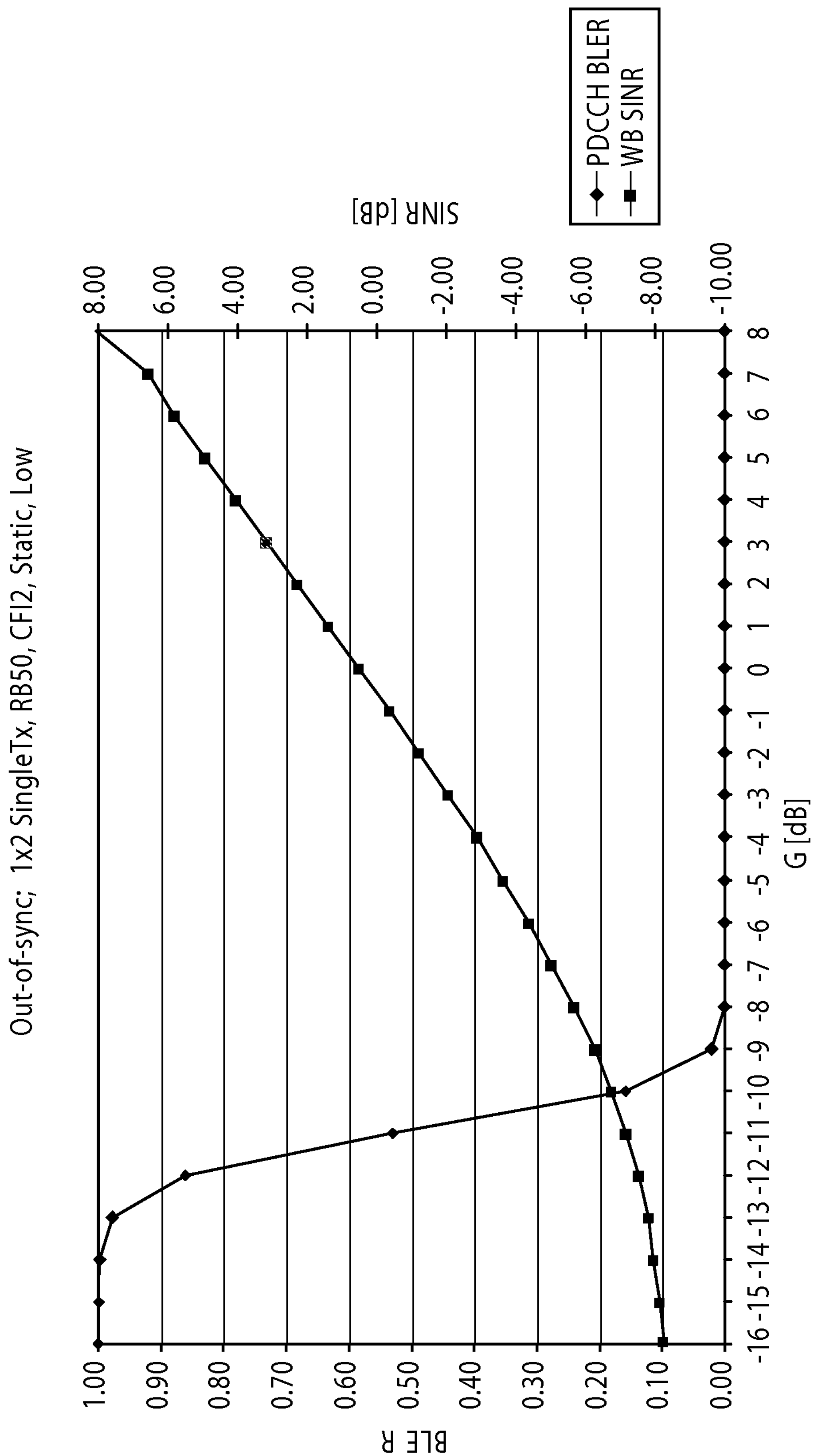
FIGS. 4-11 illustrate simulation results.
Figure 5:
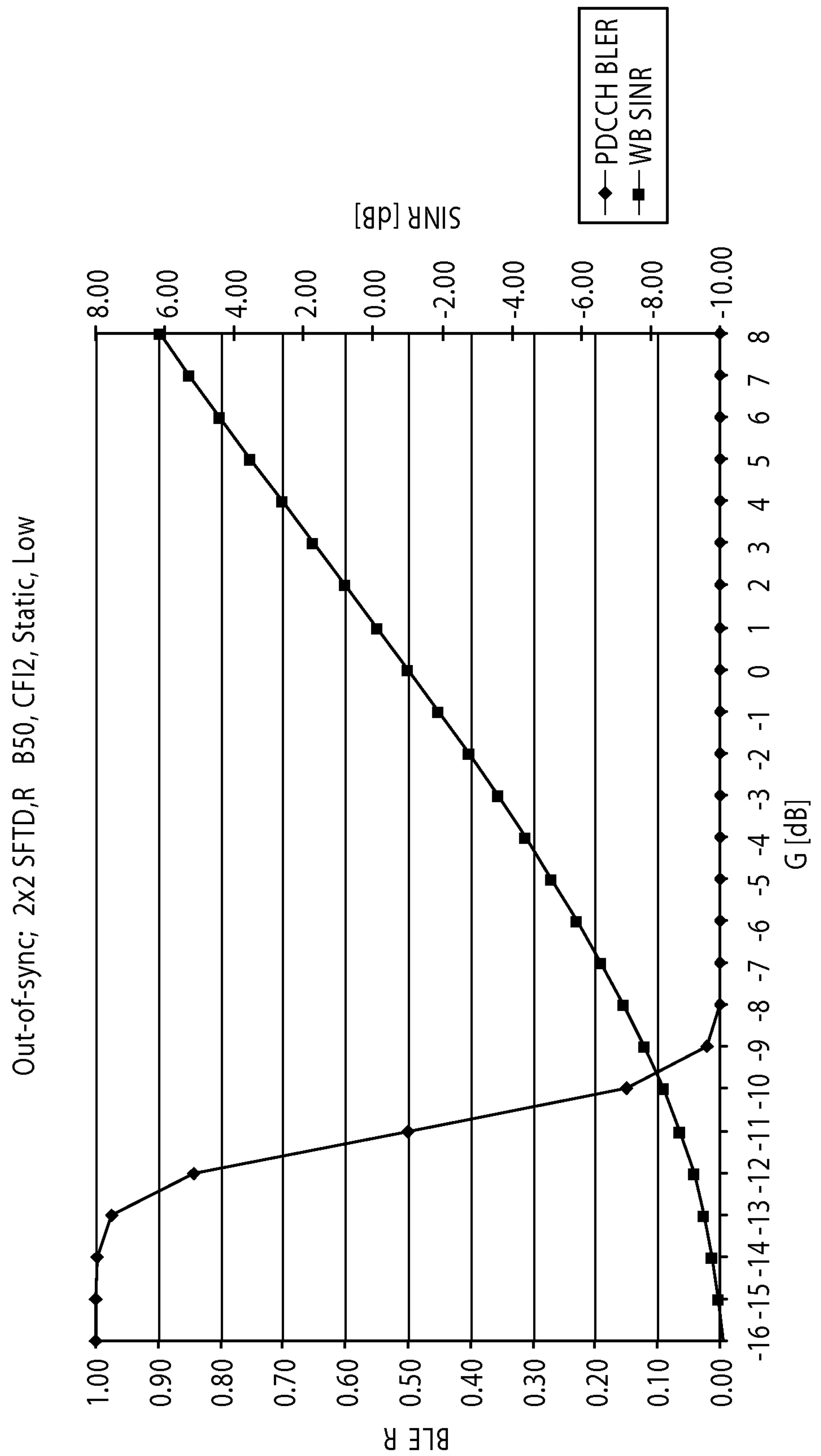
Figure 6:
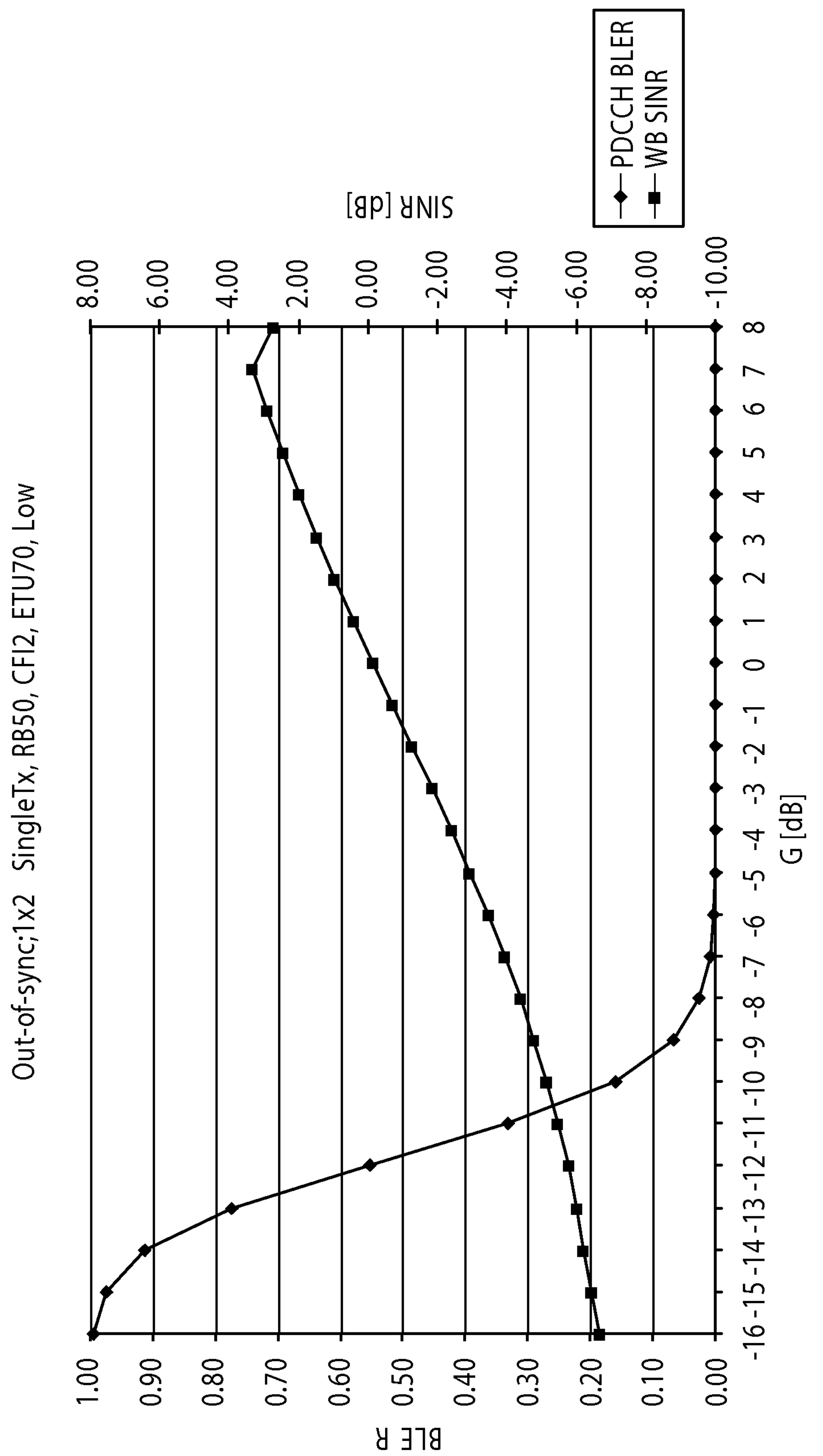
Figure 7:
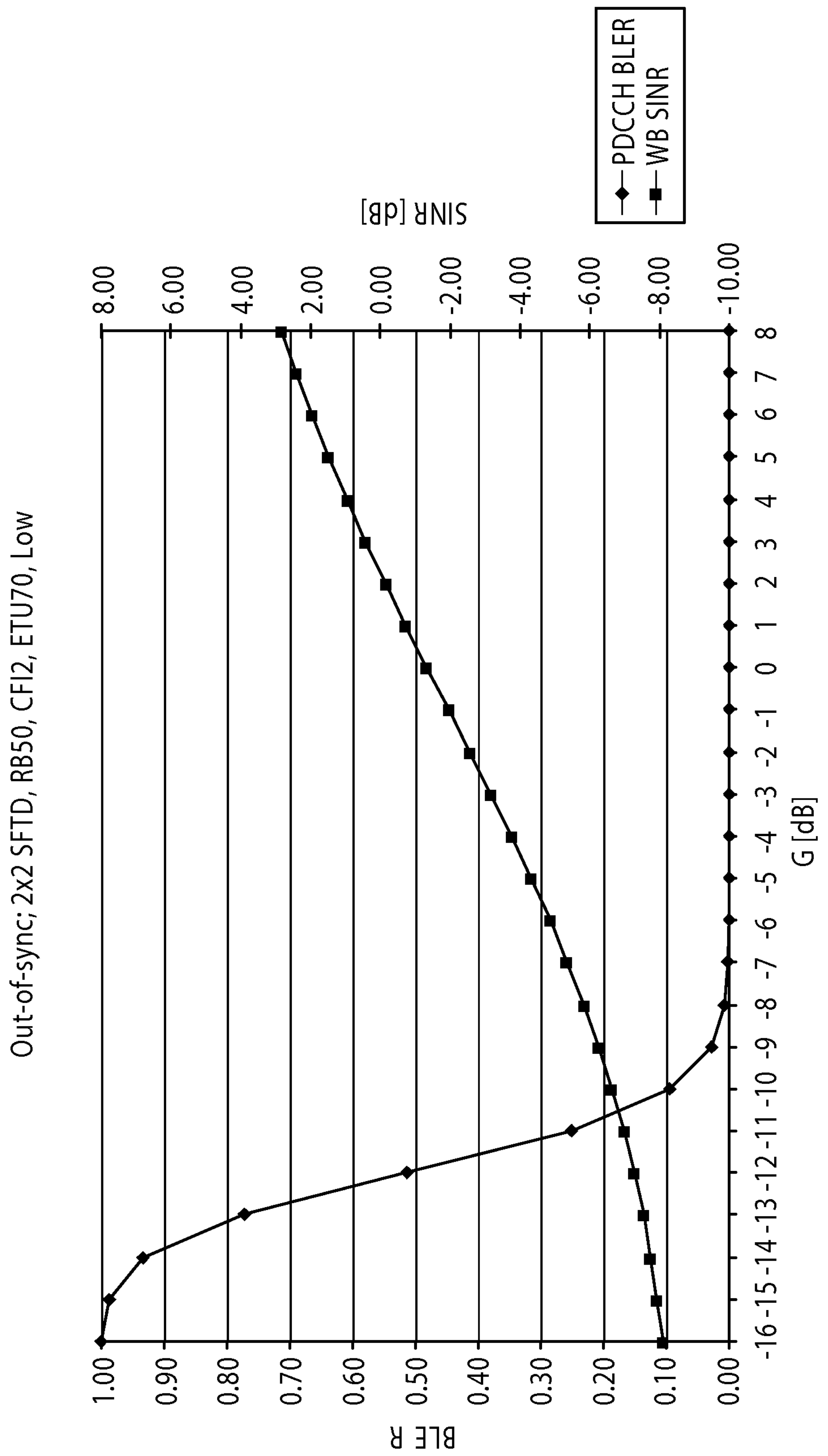
Figure 8:
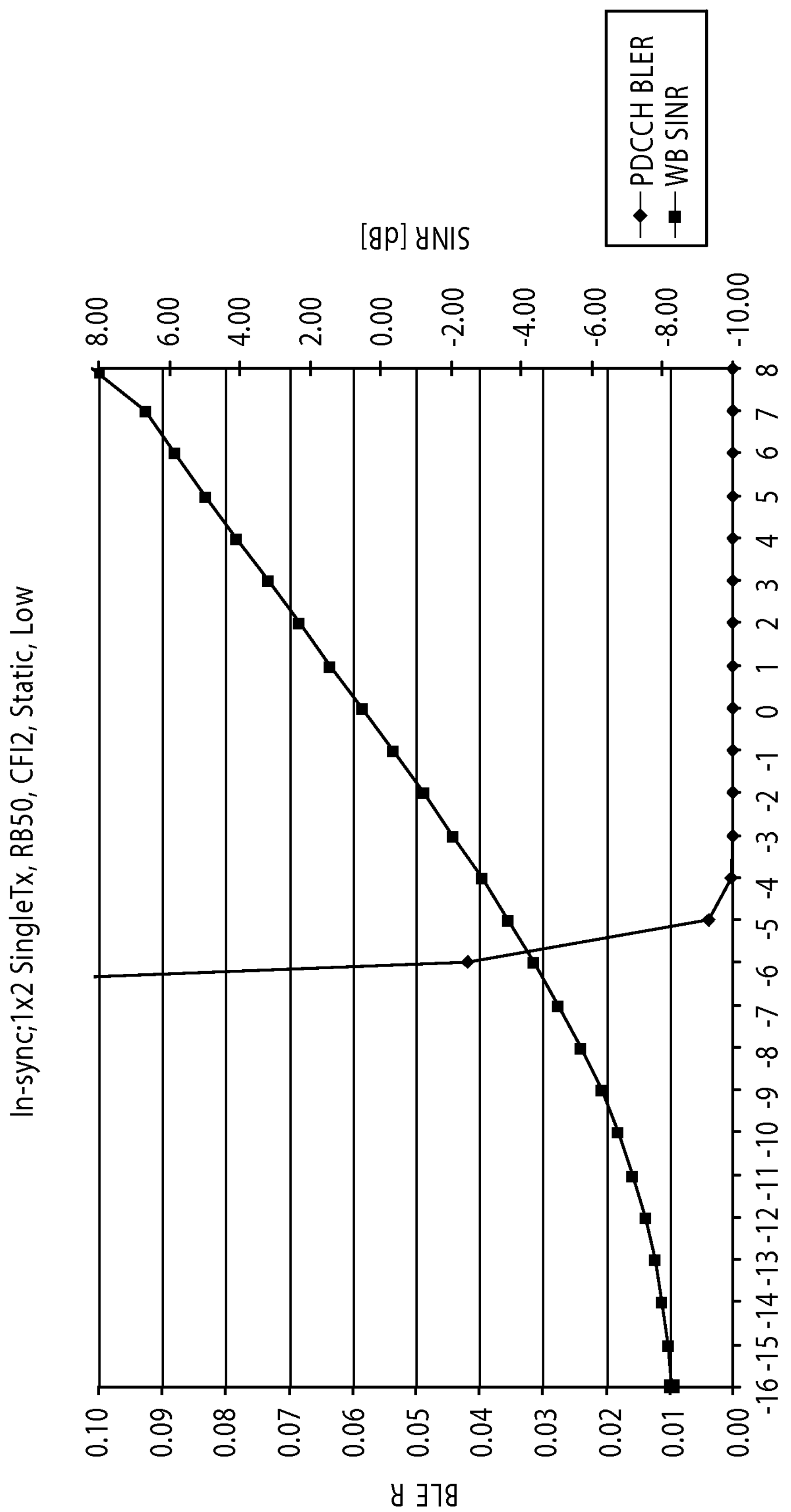
Figure 9:
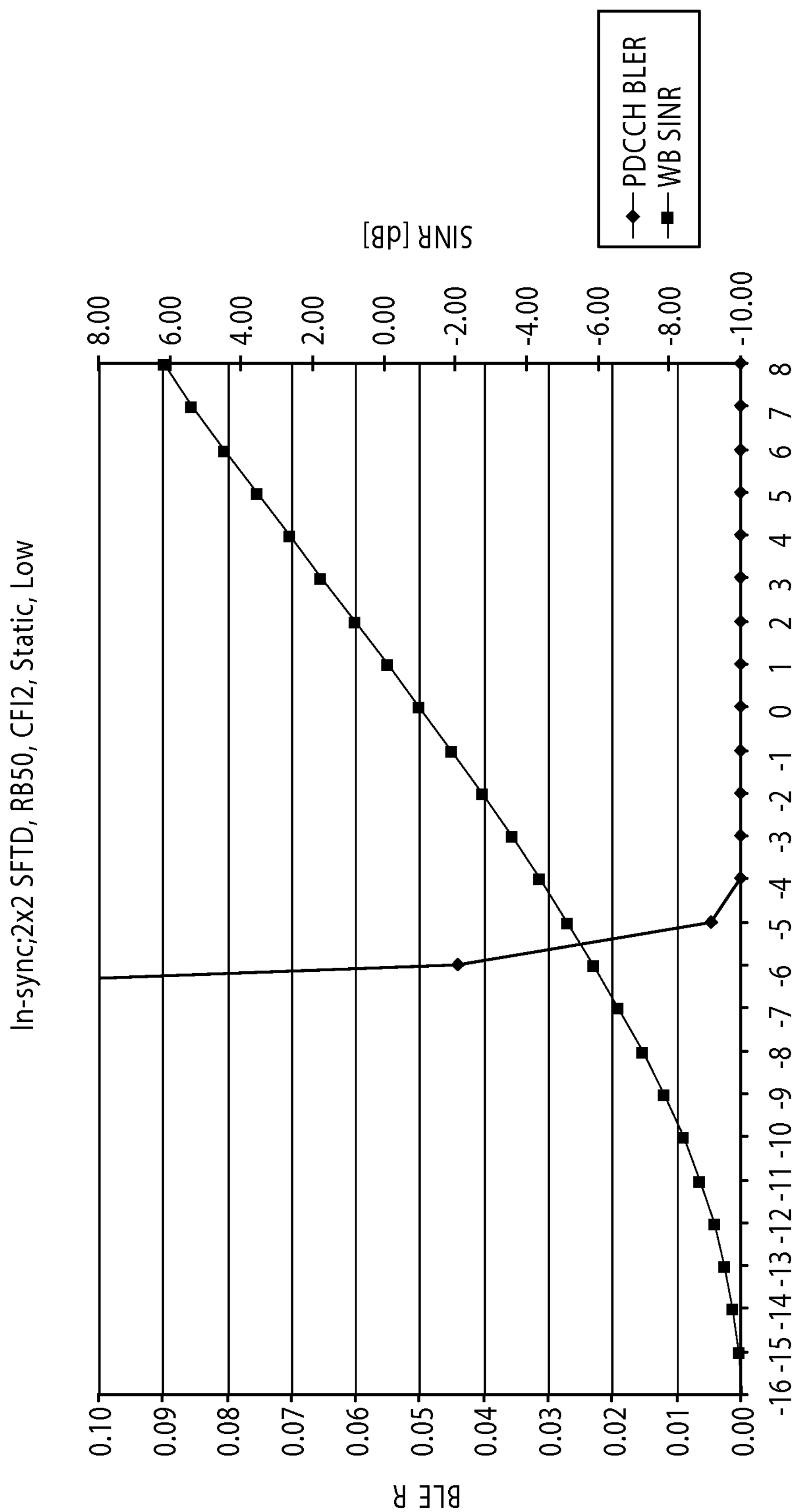
Figure 10:
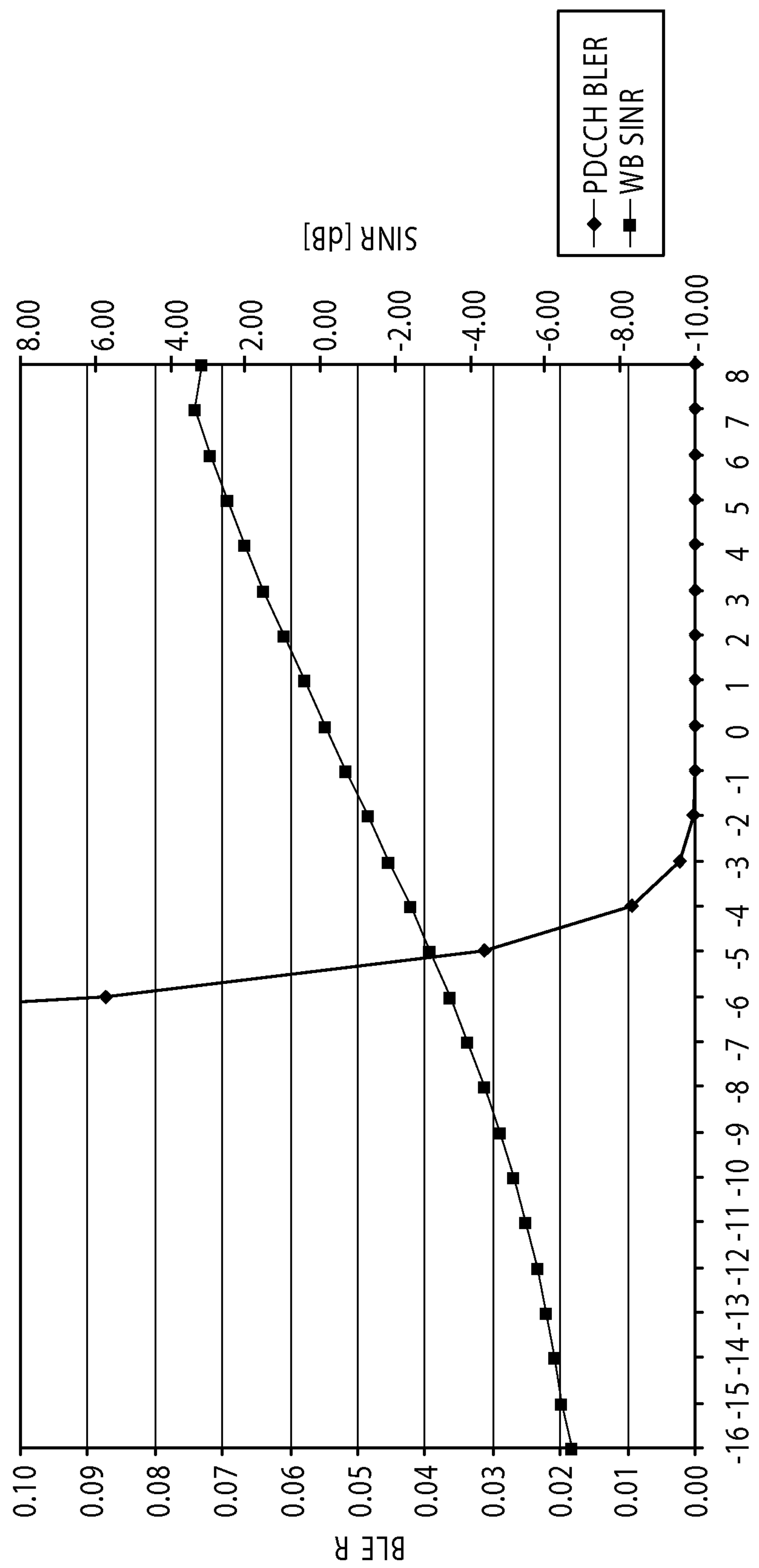
Figure 11:
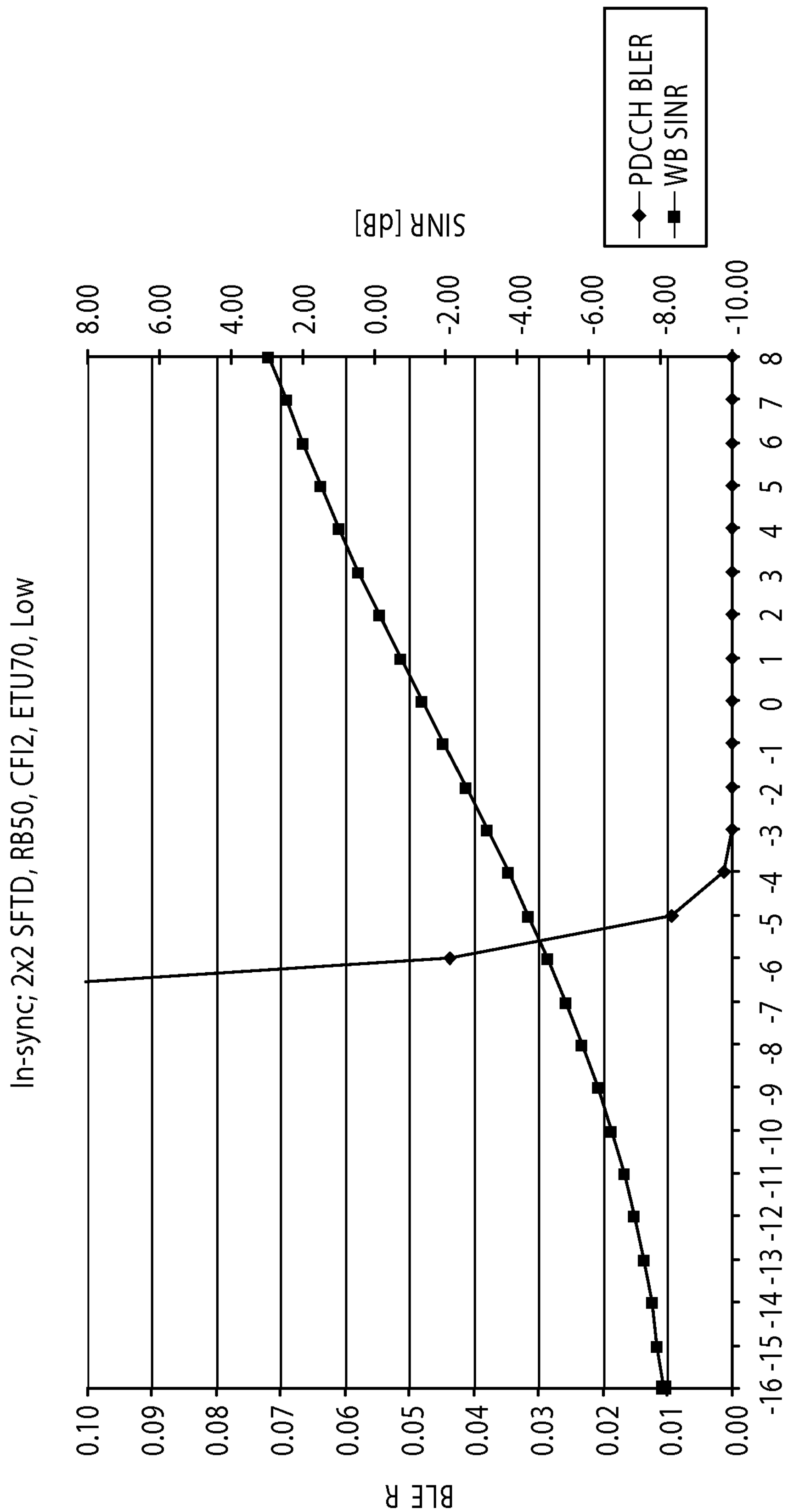

An effective SINR mapping based approach can average the MI or RBIR values corresponding to narrowband SINR values in frequency between the resource blocks and then to estimate the downlink radio link quality from the averaged mutual information domain value by mapping it back to average wideband SINR value. The effective SINR mapping based approach can be implemented by 'post-detection SINR estimation', 'post-detection SINR to RBIR mapping', 'RBIR domain averaging of the post-detection SINR values', 'radio link quality estimation' and 'radio link monitoring functions' illustrated in FIG. 3. These functions are described in more detail below.

Post-Detection SINR Estimation

The post-detection SINR for each resource block can be first computed and averaged from channel and covariance estimates which are estimated using the cell-specific reference signals. The different interference rejection or interference cancellation receiver structure can be incorporated into these SINR estimates. Assuming two receive antennas at the UE and one transmit antenna at the base station, the received signal (which is assumed to be an OFDMA signal) at a certain cell-specific reference signal resource element can be presented as $$r = \begin{pmatrix} r_1 \\ r_2 \end{pmatrix} = \begin{pmatrix} h_1 \\ h_2 \end{pmatrix} b + \begin{pmatrix} n_1 \\ n_2 \end{pmatrix} = hb + n \tag{1}$$

where h is a channel vector, b is known reference symbol, and n is a noise vector. In E-UTRA, signal vector r corresponds to a certain sub-carrier after the Fast Fourier Transform (FFT) of the time-domain signal. The interference rejection combining type of receiver is an antenna combiner having coefficients $$w = \begin{pmatrix} w_1 \\ w_2 \end{pmatrix} = C_{nn}^{-1}\hat{h} \tag{2}$$

where $C_{nn}^{-1}$ is an inverse spatial noise covariance matrix of the sub-carrier in question and $\hat{h}$ is an estimate of channel h. The post-detection SINR is a measure that is commonly used for selection of coding and modulation parameters in the transmitter. The SINR is, by definition, the ratio of signal power S and interference-plus-noise power I, and can be calculated for each cell-specific reference signal resource element from channel and interference and noise estimates as $$SINR = \frac{S}{I} = \frac{|w^H h|^2}{E(|w^H n|^2)} = \frac{|w^H h|^2}{w^H C_{nn} w} \tag{3}$$

If the same frequency domain averaging width exists for signal and interference power, for interference rejection combining type of receiver the post-detection symbol amplitude can be used as the SINR estimate as $$SINR = \frac{|w^H h|^2}{w^H C_{nn} w} \overset{w=C_{nn}^{-1}h}{=} \frac{|w^H h|^2}{w^H C_{nn} C_{nn}^{-1} h} = \frac{|w^H h|^2}{|w^H h|} = w^H h \tag{4}$$

Similar derivation is possible for interference cancellation type of receivers by taking inter-stream interference (or lack of it) into account in the noise covariance matrix.

Post-Detection SINR to RBIR Mapping

The post-detection SINR estimates can be converted to the received bit information rate (RBIR) domain so that they can be averaged in frequency and in time domains according to a configuration defined by the Node B. The RBIR values can be modulation specific, which means that from a single SINR value there come RBIR values for every possible modulation scheme. The SINR mapping to RBIR can be done using fixed look-up-tables that map SINR values to the mutual information (MI) domain. Thus, the post-detection SINR values can be converted first to the MI domain and then to the RBIR domain by dividing the MI domain values with the number of bits per used modulation. Using an MI based mapping function can enable the calculation to proceed from instantaneous channel and interference state for each physical resource block to corresponding control channel block error rate (BLER) without separate mapping tables for different channel realizations, which has been a convention technique in such systems as 3G.

RBIR Domain/MI Domain Averaging

The resource block specific RBIR values or MI values can then be averaged both in time and in frequency. First the resource block specific RBIR values can be averaged over the system bandwidth and then the slot specific wideband SINR can be averaged over the two time slots to get sub-frame specific wideband SINR value for radio link monitoring.

Radio Link Quality Estimate

The wideband SINR value for each sub-frame can then be further averaged in time in radio link monitoring to compute a radio link quality estimate from which, for example, fast fading can be averaged away. This averaging can be implemented, for example, with an exponential aeverager, infinite impulse response (IIR) or finite impulse response (FIR) type of filter.

Radio Link Monitoring

The averaged wideband SINR value can then be used for comparison with the Qout and Qin threshold for detection and indication of the out-of-sync or in-sync condition from the Layer 1 to higher layers of the User Equipment (UE).

Technical considerations of certain embodiments of the present invention are that the wideband SINR estimate for the E-UTRA radio link monitoring can be averaged between different resource blocks in frequency and that the receiver structure can be incorporated in the estimation of the wideband SINR. One notable aspect from using this type of MI based effective SINR mapping function is that it enables the user of the system to go from instantaneous channel and interference state for each physical resource block to corresponding control channel BLER without separate mapping tables for different channel realizations, which has been the usual method in conventional systems. The wideband RBIR, i.e., the RBIR over the system bandwidth, may be already computed in the current Channel Quality Indicator (CQI) and it may consequently already be available for the implementation of the radio link monitoring.

The effective SINR mapping, i.e., mutual information based wideband SINR (W SINR) was simulated briefly in a LTE link level simulator to find out whether the dynamic range of this SINR would be enough for radio link monitoring. The simulation result for different transmission configurations are presented in FIGS. 4-11, although it should be understood that these results cover only a sub-set of the possible transmission configurations. It can be seen from the simulation results in FIGS. 4-11 that the dynamic range of the wideband SINR is enough for the purpose of E-UTRA radio link monitoring for the 10% and 2% PDCCH BLER operation points in this studied case.

Figure 12:
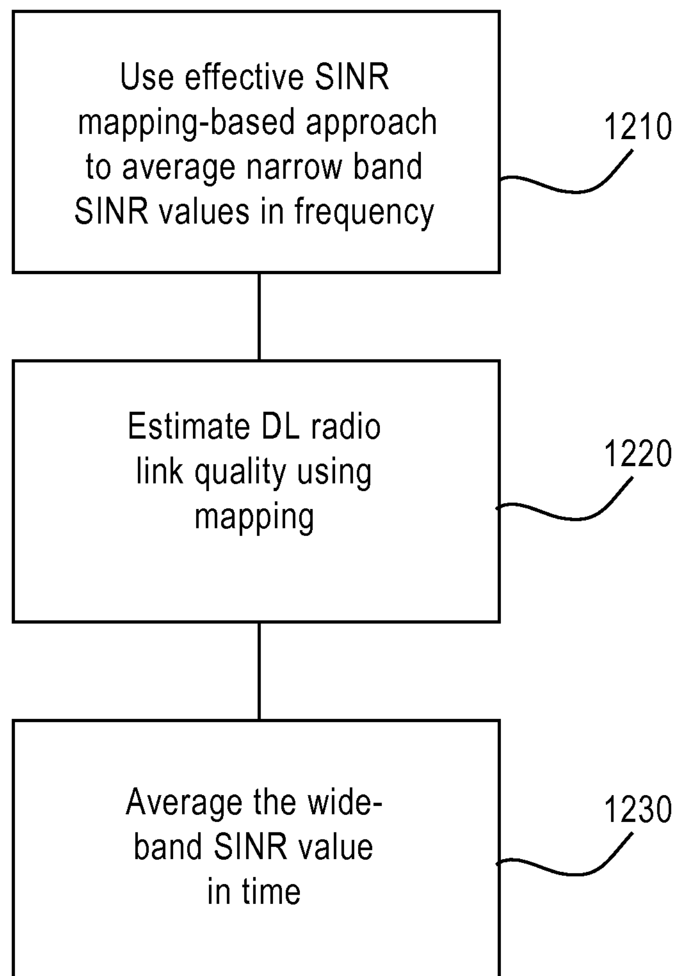
FIG. 12 illustrates a method according to certain embodiments of the present invention.

FIG. 12 illustrates a method according to certain embodiments of the present invention. The method shown in FIG. 12 includes using 1210 an effective SINR mapping based approach to average the MI or RBIR values corresponding to narrowband SINR values in frequency between the resource blocks of the resource grid structure, to produce an averaged mutual information domain value. The resource block-wise SINR can already have been averaged from the reference resource elements (REs) in one resource block. In other words, the resource block-wise SINR values can already have been computed beforehand. The effective SINR mapping based approach can include mutual information based effective SINR mapping. The effective SINR mapping based approach can include post-detection SINR estimation. The effective SINR mapping based approach can include post-detection SINR to RBIR mapping or mutual information (MI) mapping. The effective SINR mapping based approach can include RBIR domain (or MI domain) averaging of the post-detection SINR values.

The method also includes estimating 1220 downlink radio link quality from the averaged mutual information domain value by mapping the averaged mutual information domain value back to a wideband SINR value covering a part up to the whole of the system bandwidth. The system bandwidth can be E-UTRA system bandwidth.

The method further includes further averaging 1230 the wideband SINR value in time to provide a time-averaged SINR value. The method additionally includes using the time-averaged SINR value as a downlink radio link quality estimate for radio link monitoring.

The radio link monitoring can include E-UTRA radio link monitoring. The radio link monitoring can be performed without using channel state information (CSI). The radio link monitoring can include comparing the time-averaged SINR value to a Qout threshold. The radio link monitoring can include comparing the time-averaged SINR value to a Qin threshold.

Figure 13:
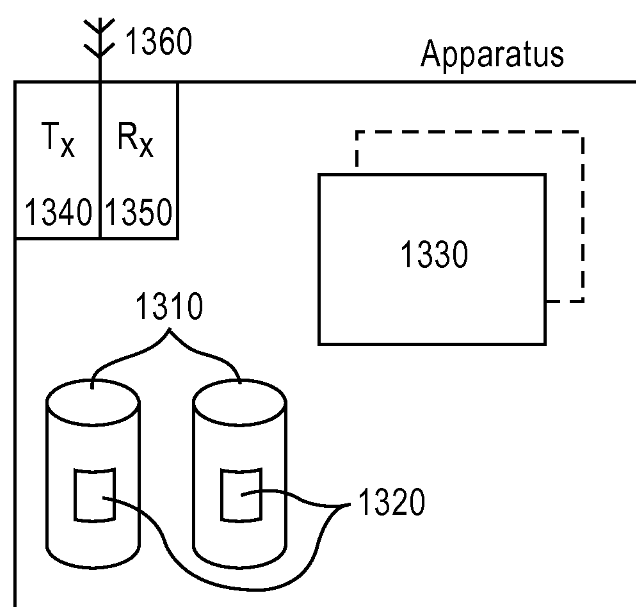
FIG. 13 illustrates an apparatus according to certain embodiments of the present invention.

FIG. 13 illustrates an apparatus. The apparatus can include at least one memory 1310 including computer program code 1320 and at least one processor 1330. The apparatus can also include other equipment such as a transmitter 1340, receiver 1350, and antenna 1360. The at least one memory 1310 including computer program code 1320 and the at least one processor 1330 can be configured to cause the apparatus to perform a method such as the method shown in FIG. 3 or FIG. 12.

The memory 1310 can be implemented in any suitable way that provides storage of data. For example, random access memory (RAM) and read only memory (ROM) can be used. The computer program code 1320 can be any suitable set of computer instructions in an appropriate format such as a machine language or an interpreted language. The processor 1330 can be a general purpose computer process, a central processing unit (CPU), an application specific integrate circuit (ASIC) or the like. The transmitter 1340 and receiver 1350 can be implemented together as a transceiver or separately. The antenna 1360 can be made up of one or more antenna elements.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A method, comprising:

using a quality mapping approach to average mutual information or received bit information rate values corresponding to narrowband signal to interference plus noise ratio values in frequency between resource blocks of a resource grid structure, to produce an averaged mutual information domain value;

estimating downlink radio link quality from the averaged mutual information domain value by mapping the averaged mutual information domain value back to a wideband signal to interference plus noise ratio value covering a part up to a whole of system bandwidth;

further averaging the wideband signal to interference plus noise ratio value in time to provide a time-averaged signal to interference plus noise ratio value; and using the time-averaged signal to interference plus noise ratio value as a downlink radio link quality estimate for radio link monitoring.

2. The method of claim 1, wherein the quality mapping approach comprises mutual information based effective signal to interference plus noise ratio mapping.

3. The method of claim 1, wherein the system bandwidth is Evolved Universal Terrestrial Radio Access system bandwidth.

4. The method of claim 1, wherein the radio link monitoring comprises Evolved Universal Terrestrial Radio Access radio link monitoring.

5. The method of claim 1, wherein the radio link monitoring is performed without using channel state information.

6. The method of claim 1, wherein the quality mapping approach comprises post-detection signal to interference plus noise ratio estimation, or wherein the quality mapping approach comprises post-detection signal to interference plus noise ratio to received bit information rate mapping or mutual information mapping.

7. The method of claim 1, wherein the quality mapping approach comprises received bit information rate domain, or mutual information domain, averaging of the post-detection signal to interference plus noise ratio values.

8. The method of claim 1, wherein the radio link monitoring comprises comparing the time-averaged signal to interference plus noise ratio value to a Qout threshold, or wherein the radio link monitoring comprises comparing the time-averaged signal to interference plus noise ratio value to a Qin threshold.

9. The method of claim 1, further comprising:

when further time averaging of a mutual information domain signal to interference plus noise ratio is not needed, using only mutual information domain thresholds for radio link monitoring.

10. A non-transitory computer-readable storage medium encoded with instructions that, executed in hardware, perform a method according to claim 1.

11. An apparatus, comprising:

at least one memory including computer program code; and at least one processor, wherein the at least one memory and the computer program code are configured to, with the at least one processor, cause the apparatus at least to use a quality mapping approach to average mutual information or received bit information rate values corresponding to narrowband signal to interference plus noise ratio values in frequency between resource blocks of a resource grid structure, to produce an averaged mutual information domain value;

estimate downlink radio link quality from the averaged mutual information domain value by mapping the averaged mutual information domain value back to a wideband signal to interference plus noise ratio value covering a part up to a whole of system bandwidth;

further average the wideband signal to interference plus noise ratio value in time to provide a time-averaged signal to interference plus noise ratio value; and use the time-averaged signal to interference plus noise ratio value as a downlink radio link quality estimate for radio link monitoring.

12. The apparatus of claim 11, wherein the quality mapping approach comprises mutual information based effective signal to interference plus noise ratio mapping.

13. The apparatus of claim 11, wherein the system bandwidth is Evolved Universal Terrestrial Radio Access (E-UTRA) system bandwidth.

14. The apparatus of claim 11, wherein the radio link monitoring comprises Evolved Universal Terrestrial Radio Access (E-UTRA) radio link monitoring.

15. The apparatus of claim 11, wherein the radio link monitoring is performed without using channel state information.

16. The apparatus of claim 11, wherein the quality mapping approach comprises post-detection signal to interference plus noise ratio estimation, or wherein the quality mapping approach comprises post-detection signal to interference plus noise ratio to received bit information rate mapping or mutual information mapping.

17. The apparatus of claim 11, wherein the quality mapping approach comprises received bit information rate domain, or mutual information domain, averaging of the post-detection signal to interference plus noise ratio values.

18. The apparatus of claim 11, wherein the radio link monitoring comprises comparing the time-averaged signal to interference plus noise ratio value to a Qout threshold, or wherein the radio link monitoring comprises comparing the time-averaged signal to interference plus noise ratio value to a Qin threshold.

19. The apparatus of claim 11, wherein the at least one memory and the computer program code are configured to, with the at least one processor, cause the apparatus at least to, when further time averaging of a mutual information domain signal to interference plus noise ratio is not needed, use only mutual information domain thresholds for radio link monitoring.

* * * * *